United States Patent
Shanmugavel et al.

(10) Patent No.: US 10,482,344 B2
(45) Date of Patent: Nov. 19, 2019

(54) SYSTEM AND METHOD FOR PERFORMING OPTICAL CHARACTER RECOGNITION

(71) Applicant: Wipro Limited, Bangalore (IN)

(72) Inventors: Sibi Chakravarthy Shanmugavel, Tamil Nadu (IN); Sandhya Ramachandran, Bangalore (IN); Abhinay Reddy Vongur, Hyderabad (IN)

(73) Assignee: Wipro Limited, Bangalore (IN)

( * ) Notice: Subject to any disclaimer, the term of this patent is extended or adjusted under 35 U.S.C. 154(b) by 26 days.

(21) Appl. No.: 15/900,300

(22) Filed: Feb. 20, 2018

(65) Prior Publication Data

US 2019/0205690 A1 Jul. 4, 2019

(30) Foreign Application Priority Data

Jan. 4, 2018 (IN) .............................. 201841000369

(51) Int. Cl.
*G06K 9/34* (2006.01)
*G06T 5/00* (2006.01)

(52) U.S. Cl.
CPC .............. *G06K 9/346* (2013.01); *G06T 5/002* (2013.01); *G06T 2207/20182* (2013.01)

(58) Field of Classification Search
CPC .......... G06K 9/346; G06K 9/34; G06K 9/348; G06K 9/00442; G06K 9/00456; G06K 9/00463; G06K 9/46; G06K 9/2054; G06T 5/002; G06T 2207/20182
See application file for complete search history.

(56) References Cited

U.S. PATENT DOCUMENTS

| | | | | |
|---|---|---|---|---|
| 3,648,271 A * | 3/1972 | McConnell | ............. | B41B 27/00 345/23 |
| 5,402,504 A * | 3/1995 | Bloomberg | ........ | G06K 9/00456 382/175 |
| 5,570,435 A * | 10/1996 | Bloomberg | ........ | G06K 9/00456 382/176 |
| 5,832,531 A * | 11/1998 | Ayers | ................. | G06K 9/00463 715/209 |
| 6,081,773 A * | 6/2000 | Hirai | ..................... | G06F 17/272 704/3 |
| 6,470,336 B1 * | 10/2002 | Matsukawa | ........ | G06K 9/00442 |
| 6,771,813 B1 * | 8/2004 | Katsuyama | ........ | G06K 9/00463 345/589 |
| 7,260,574 B2 * | 8/2007 | McConnell | ......... | G06F 17/2863 |
| 7,426,687 B1 * | 9/2008 | Schultz | ............... | G06F 16/9566 715/208 |
| 7,706,611 B2 | 4/2010 | King et al. | | |

(Continued)

*Primary Examiner* — Manav Seth
(74) *Attorney, Agent, or Firm* — Pepper Hamilton LLP

(57) ABSTRACT

Disclosed herein is a system and method for performing OCR. The method includes receiving a textual image, and extracting one or more character images along with one or more corresponding position indices from the textual image. A position index of a character image may include a line number, a word number, and a character number of the character image within the textual image. The method further includes determining one or more characters corresponding to the one or more character images using an OCR algorithm, and generating a text by positioning the one or more characters based on the one or more position indices of the one or more corresponding character images.

15 Claims, 16 Drawing Sheets

(56) References Cited

U.S. PATENT DOCUMENTS

| | | |
|---|---|---|
| 8,036,463 B2 | 10/2011 | Shimodaira |
| 8,345,978 B2 | 1/2013 | Uzelac et al. |
| 8,401,293 B2 | 3/2013 | Antonijevic et al. |
| 8,571,270 B2 | 10/2013 | Nijemcevic |
| 9,412,052 B1 * | 8/2016 | Natarajan ................ G06K 9/40 |

* cited by examiner

This demo will show you how to add line spacing ⬅ 503 using custom paragraph style with iOS. This is a great use of NSAttributedString to add necessary parameters to the string value.Hope you have enjoyed it

FIG. 5C

This demo will show you how to add line spacing ⬅ 504A using custom paragraph style with iOS. This is a ⬅ 504B great use of NSAttributedString to add ⬅ 504C necessary parameters to the string value.Hope ⬅ 504D

FIG. 5D

This demo will show you how to add line spacing ⬅ 505

| CLASSIFIER NUMBER | IMAGE NAME | OCR OUTPUT |
|---|---|---|
| 33 | 1_1_1.png | T |
| 51 | 1_1_2.png | h |
| 52 | 1_1_3.png | i |
| 62 | 1_1_4.png | s |
| 45 | 1_2_1.png | d |
| 47 | 1_2_2.png | e |
| 56 | 1_2_3.png | m |
| 58 | 1_2_4.png | o |
| 66 | 1_3_1.png | w |
| 52 | 1_3_2.png | i |
| 55 | 1_3_3.png | l |
| 55 | 1_3_4.png | l |
| 62 | 1_4_1.png | s |
| 51 | 1_4_2.png | h |
| 58 | 1_4_3.png | o |
| 66 | 1_4_4.png | w |
| 68 | 1_5_1.png | y |
| 58 | 1_5_2.png | o |
| 64 | 1_5_3.png | u |
| 51 | 1_6_1.png | h |
| 58 | 1_6_2.png | o |
| 66 | 1_6_3.png | w |

```
This demo will show you how to add line spacing
using custom paragraph style with iOS.This is a
great use of NSAttributedString to add
necessary parameters to the string value.Hope
you have enjoyed it
```

FIG. 5K

| Algorithm | Precision | Recall | $f$ | Time (sec.) |
|---|---|---|---|---|
| Our system | 0.73 | 0.60 | 0.66 | 0.94 |
| Hinnerk Becker | 0.62 | 0.67 | 0.62 | 14.4 |
| Alex Chen | 0.60 | 0.60 | 0.58 | 0.35 |
| Qiang Zhu | 0.33 | 0.40 | 0.33 | 1.6 |
| Jisoo Kim | 0.22 | 0.28 | 0.22 | 2.2 |
| Nobuo Ezaki | 0.18 | 0.36 | 0.22 | 2.8 |
| Ashida | 0.55 | 0.46 | 0.50 | 8.7 |
| HWDavid | 0.44 | 0.46 | 0.45 | 0.3 |
| Wolf | 0.30 | 0.44 | 0.35 | 17.0 |
| Todoran | 0.19 | 0.18 | 0.18 | 0.3 |
| Full | 0.1 | 0.06 | 0.08 | 0.2 |

| Algorithm | Precision | Recall | $f$ | Time (sec.) |
|---|---|---|---|---|
| Our system | 0.73 | 0.60 | 0.66 | 0.94 |
| Hinnerk Becker | 0.62 | 0.67 | 0.62 | 14.4 |
| Alex Chen | 0.60 | 0.60 | 0.58 | 0.35 |
| Qiang Zhu | 0.33 | 0.40 | 0.33 | 1.6 |
| Jisoo Kim | 0.22 | 0.28 | 0.22 | 2.2 |
| Nobuo Ezaki | 0.18 | 0.36 | 0.22 | 2.8 |
| Ashida | 0.55 | 0.46 | 0.50 | 8.7 |
| HWDavid | 0.44 | 0.46 | 0.45 | 0.3 |
| Wolf | 0.30 | 0.44 | 0.35 | 17.0 |
| Todoran | 0.19 | 0.18 | 0.18 | 0.3 |
| Full | 0.1 | 0.06 | 0.08 | 0.2 |

| Algorithm | Precision | Recall | f | Time (sec.) |
|---|---|---|---|---|
| Our system | 0.73 | 0.60 | 0.66 | 0.94 |
| Hinnerk Becker | 0.62 | 0.67 | 0.62 | 14.4 |
| Alex Chen | 0.60 | 0.60 | 0.58 | 0.35 |
| Qiang Zhu | 0.33 | 0.40 | 0.33 | 1.6 |
| Jisoo Kim | 0.22 | 0.28 | 0.22 | 2.2 |
| Nobuo Ezaki | 0.18 | 0.36 | 0.22 | 2.8 |
| Ashida | 0.55 | 0.46 | 0.50 | 8.7 |
| HWDavid | 0.44 | 0.46 | 0.45 | 0.3 |
| Wolf | 0.30 | 0.44 | 0.35 | 17.0 |
| Todoran | 0.19 | 0.18 | 0.18 | 0.3 |
| Full | 0.1 | 0.06 | 0.08 | 0.2 |

FIG. 6C

| Algorithm | Precision | Recall | f | Time (sec.) |
|---|---|---|---|---|
| Our system | 0.73 | 0.60 | 0.66 | 0.94 |
| Hinnerk Becker | 0.62 | 0.67 | 0.62 | 14.4 |
| Alex Chen | 0.60 | 0.60 | 0.58 | 0.35 |
| Qiang Zhu | 0.33 | 0.40 | 0.33 | 1.6 |
| Jisoo Kim | 0.22 | 0.28 | 0.22 | 2.2 |
| Nobuo Ezaki | 0.18 | 0.36 | 0.22 | 2.8 |
| Ashida | 0.55 | 0.46 | 0.50 | 8.7 |
| HWDavid | 0.44 | 0.46 | 0.45 | 0.3 |
| Wolf | 0.30 | 0.44 | 0.35 | 17.0 |
| Todoran | 0.19 | 0.18 | 0.18 | 0.3 |
| Full | 0.1 | 0.06 | 0.08 | 0.2 |

FIG. 6D

| Algorithm | Precision | Recall | f | Time (sec.) |
|---|---|---|---|---|
| Our system | 0.73 | 0.60 | 0.66 | 0.94 |
| Hinnerk Becker | 0.62 | 0.67 | 0.62 | 14.4 |
| Alex Chen | 0.60 | 0.60 | 0.58 | 0.35 |
| Qiang Zhu | 0.33 | 0.40 | 0.33 | 1.6 |
| Jisoo Kim | 0.22 | 0.28 | 0.22 | 2.2 |
| Nobuo Ezaki | 0.18 | 0.36 | 0.22 | 2.8 |
| Ashida | 0.55 | 0.46 | 0.50 | 8.7 |
| HWDavid | 0.44 | 0.46 | 0.45 | 0.3 |
| Wolf | 0.30 | 0.44 | 0.35 | 17.0 |
| Todoran | 0.19 | 0.18 | 0.18 | 0.3 |
| Full | 0.1 | 0.06 | 0.08 | 0.2 |

FIG. 6E

| Algorithm | Precision | Recall | f | Time (sec.) |← 606A
|---|---|---|---|---|
| Our system | 0.73 | 0.60 | 0.66 | 0.94 |← 606B
| Hinnerk Becker | 0.62 | 0.67 | 0.62 | 14.4 |← 606C
| Alex Chen | 0.60 | 0.60 | 0.58 | 0.35 |← 606D
| Qiang Zhu | 0.33 | 0.40 | 0.33 | 1.6 |← 606E

FIG. 6F

| Algorithm | Precision | Recall | f | Time (sec.) |← 607A
|---|---|---|---|---|
| Our system | 0.73 | 0.60 | 0.66 | 0.94 |← 607B
| Hinnerk Becker | 0.62 | 0.67 | 0.62 | 14.4 |← 607C
| Alex Chen | 0.60 | 0.60 | 0.58 | 0.35 |← 607D
| Qiang Zhu | 0.33 | 0.40 | 0.33 | 1.6 |← 607E

FIG. 6G

| Algorithm | Precision | Recall | f | Time (sec.) |
|---|---|---|---|---|
| Our system | 0.73 | 0.60 | 0.66 | 0.94 |
| Hinnerk Becker' | 0.62 | 0,67 | 0.62 | 14.4 |
| Alex Chen | 0.60 | 0.60 | 0.58 | 0.35 |
| Oianz Zhu | 0.33 | 0.40 | 0.33 | 1.6 |
| Jisoo Kim | 0.22 | 0.28 | 0.22 | 2.2 |
| Nobuo Ezaki | 0.18 | 0.36 | 022 | 2.8 |
| Ashida | 0.55 | 0.46 | 0.50 | 8.7 |
| HWDavid | 0.44 | 0.46 | OAS | 0.3 |
| Wolf | 0.30 | 0.44 | 035 | 17.0 |
| Todoran | 0.19 | 0.18 | 0'18 | 0.3 |
| Full | 0.1 | 0.06 | 0.08 | 0.2 |

SYSTEM AND METHOD FOR PERFORMING OPTICAL CHARACTER RECOGNITION

This application claims the benefit of Indian Patent Application Serial No. 201841000369 filed Jan. 4, 2018, which is hereby incorporated by reference in its entirety.

FIELD

This disclosure relates generally to optical character recognition (OCR), and more particularly to system and method for positioning characters in output text after performing OCR.

BACKGROUND

Extracting data (e.g., text, numbers, symbols, etc.) from images (e.g., filled forms, drawings, digital documents, etc.) and building meaningful information from the extracted data is a complex and time consuming task as a number of different text, numbers, and symbols are essentially required to be identified and correlated. Typically, such data extraction and information building is done manually and is prone to human errors. More recently, computer based system have been employed to automatically extract data and build meaningful information from digital images. Many of such systems employ optical character recognition (OCR) techniques for extraction of data from the digital images.

OCR is a computer based translation of an image of text into digital form as machine-editable text (i.e., text data), generally in a standard encoding scheme. The OCR process, therefore, eliminates the need to manually type the document into the computer system. There are many existing OCR techniques to identify, recognize, and position the characters from a textual image so as to generate a text data. Most of the existing techniques, employed for positioning the recognized character in their respective position in order to generate the text data, uses pixel coordinate of each of the character. However, the usage of pixel coordinates to position the character in the text data, subsequent to character recognition, is cumbersome as it involves exhaustive identification and calculation of pixel positions. Other existing techniques, for positioning the characters inside the text data, also require extensive image analysis demanding huge amount of processing time and capability.

SUMMARY

In one embodiment, a method for performing optical character recognition (OCR) is disclosed. In one example, the method may include receiving a textual image. The method may further include extracting one or more character images along with one or more corresponding position indices from the textual image. A position index of a character image may include a line number, a word number, and a character number of the character image within the textual image. The method further may include determining one or more characters corresponding to the one or more character images using an OCR algorithm. The method may further include generating a text by positioning the one or more characters based on the one or more position indices of the one or more corresponding character images.

In one embodiment, a system for performing OCR is disclosed. In one example, the system may include at least one processor and a memory communicatively coupled to the at least one processor. The memory may store processor-executable instructions, which, on execution, may cause the processor to receive a textual image. The processor-executable instructions, on execution, may further cause the processor to extract one or more character images along with one or more corresponding position indices from the textual image. A position index of a character image may include a line number, a word number, and a character number of the character image within the textual image. The processor-executable instructions, on execution, may further cause the processor to determine one or more characters corresponding to the one or more character images using an OCR algorithm. The processor-executable instructions, on execution, may further cause the processor to generate a text by positioning the one or more characters based on the one or more position indices of the one or more corresponding character images.

In one embodiment, a non-transitory computer-readable medium storing computer-executable instructions for performing OCR is disclosed. In one example, the stored instructions, when executed by a processor, may cause the processor to perform operations including receiving a textual image. The operations may further include extracting one or more character images along with one or more corresponding position indices from the textual image. A position index of a character image may include a line number, a word number, and a character number of the character image within the textual image. The operations may further include determining one or more characters corresponding to the one or more character images using an OCR algorithm. The operations may further include generating a text by positioning the one or more characters based on the one or more position indices of the one or more corresponding character images.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIGS. 5A-5K illustrate an exemplary example of generating an output text data from an input textual image in accordance with some embodiments of the present disclosure.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
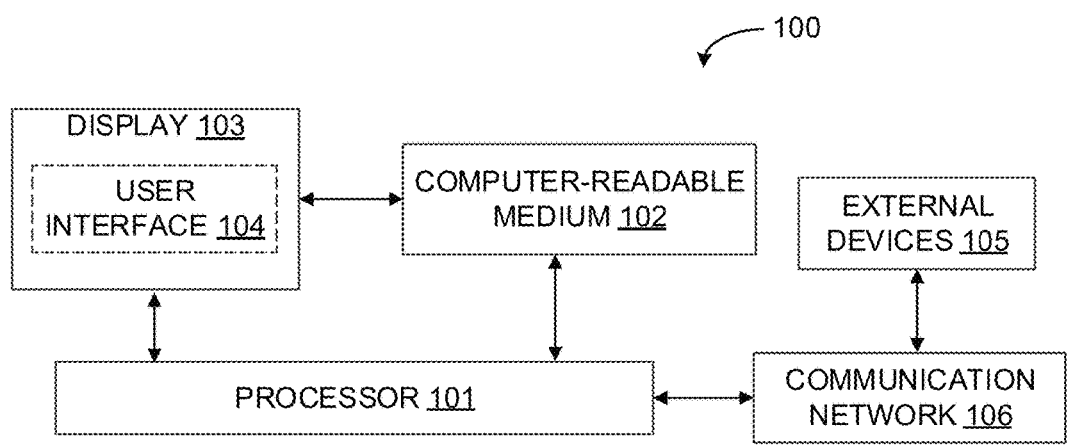
FIG. 1 is a block diagram of an exemplary system for performing optical character recognition (OCR) in accordance with some embodiments of the present disclosure.

Referring now to FIG. 1, an exemplary system 100 for performing optical character recognition (OCR) is illustrated in accordance with some embodiments of the present disclosure. In particular, the system 100 may include an OCR device (e.g., laptop, netbook, or any other computing device) that implements an OCR engine for performing OCR and for subsequently positioning characters in output text. As will be described in greater detail in conjunction with FIG. 2, the OCR engine may receive a textual image, and may extract one or more character images along with one or more corresponding position indices from the textual image. A position index of a character image may include a line number, a word number, and a character number of the character image within the textual image. Further, the OCR engine may determine one or more characters corresponding to the one or more character images using an OCR algorithm, and may generate a text by positioning the one or more characters based on the one or more position indices of the one or more corresponding character images.

The system 100 may include one or more processors 101, a computer-readable medium (e.g., a memory) 102, and a display 103. The computer-readable storage medium 102 may store instructions that, when executed by the one or more processors 101, cause the one or more processors 101 to perform OCR and generate text in accordance with aspects of the present disclosure. The computer-readable storage medium 102 may also store various data (e.g., textual images, textual line images, word images, character images, position indices, OCR algorithm, recognized characters, generated text, etc.) that may be captured, processed, and/or required by the system 100. The system 100 may interact with a user via a user interface 104 accessible via the display 103. The system 100 may also interact with one or more external devices 105 over a communication network 106 for sending or receiving various data. The external devices 105 may include, but are not limited to, a remote server, a digital device, or another computing system.

Figure 2:
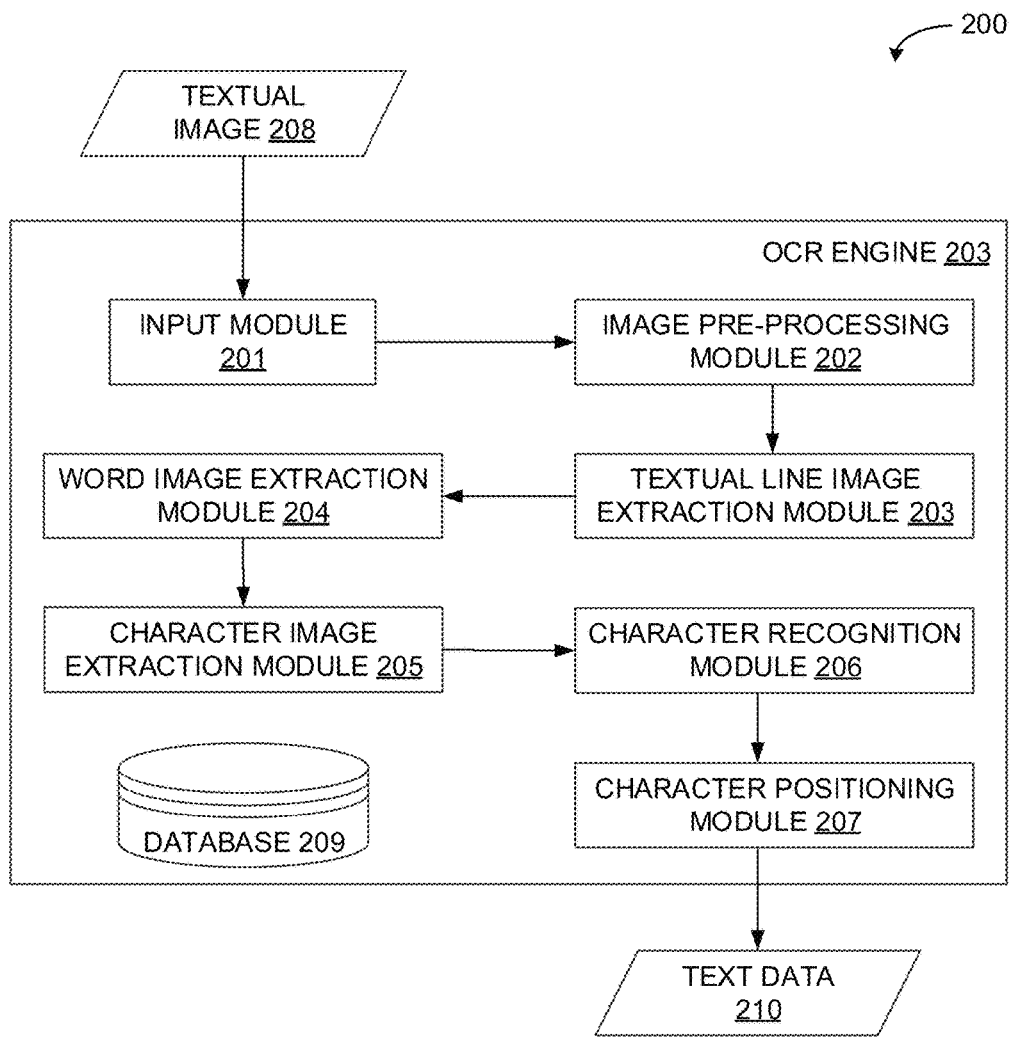
FIG. 2 is a functional block diagram of an OCR engine in accordance with some embodiments of the present disclosure.

Referring now to FIG. 2, a functional block diagram of the OCR engine 200 implemented by the system 100 of FIG. 1 is illustrated in accordance with some embodiments of the present disclosure. The OCR engine 200 may include various modules that perform various functions so as to perform OCR and generate text. In some embodiments, the OCR engine 200 may include an input module 201, an image pre-processing module 202, a textual line image extraction module 203, a word image extraction module 204, a character image extraction module 205, a character recognition module 206, and a character positioning module 207.

As will be appreciated by those skilled in the art, the input module 201 may receive a textual image 208 from a user (e.g., a pre-stored image, a scanned image, etc.), an application (e.g., Adobe Acrobat, MS Paint, Image viewer, etc.) or another device (e.g., scanner, fax machine, camera, image capturing device, etc.), and may store the received textual image 208 in the database 209. In some embodiments, the input module 201 may receive a two-dimensional (2D) image from which text data has to be extracted.

The image pre-processing module 202 may receive the textual image 208 directly from the input module 201 or from the database 209. The image pre-processing module 202 may then pre-process the received textual image 208 to generate image data (representing the textual image 208) for subsequent processing, and may store the generated image data in the database 209. In some embodiments, the image pre-processing module 202 may perform image pre-processing by applying standard signal-processing techniques to the received textual image 208. In some embodiments, the pre-processing may include, but is not limited to, performing grey-scale conversion of the textual image, filtering noise from the greyscale image, correcting orientation of the greyscale image, correcting distortion in the greyscale image, binarizing the greyscale image, and so forth.

The textual line image extraction module 203 may receive image data directly from the image pre-processing module 202 or from the database 209. The textual line image extraction module 203 may then extract textual line images along with corresponding line numbers from the image data. The textual line image extraction module 203 may first analyze the image data so as to identify textual lines from the image data. For example, in order to identify the textual lines, the textual line image extraction module 203 may determine contiguous stretches of horizontal non-textual spaces in the greyscale image or the binarized textual image. Each of the contiguous stretches of horizontal non-textual spaces may include a number of horizontal non-textual bins. It should be noted that a horizontal bin may be a continuous stretch of pixels from the left margin of image to the right margin of the image. Thus, all the pixels in a particular horizontal bin may correspond to a particular row of the textual image (i.e. all the pixels in a horizontal bin have the same y co-ordinate). A horizontal non-textual bin may consist of almost all non-text pixels (i.e., white pixels in the greyscale image, or black pixels in the binarized image). In some embodiments, the number of horizontal non-textual bins may be in excess of or equal to a predetermined horizontal threshold. Further, in some embodiments, the predetermined horizontal threshold may be determined based on an analysis of the textual image.

Further, the textual line image extraction module 203 may extract image of each of the identified textual lines. For example, the textual line image extraction module 203 may determine a mean vertical coordinate of the pixels in each of the contiguous stretches of horizontal non-textual spaces, and segment the textual image into textual line images based on the mean vertical coordinate of each of the contiguous stretches of horizontal non-textual spaces. In some embodiments, the mean vertical co-ordinate may be determined by averaging the vertical co-ordinates of all the pixels in the horizontal non-textual bins between two textual lines. Thus, using the mean vertical co-ordinate, the input textual image may be segmented into a plurality of images such that each image may represent a textual line. The textual line image extraction module 203 may then store extracted images of the textual lines, in the database 209, as separate images along with corresponding line numbers. In some embodiments, each of the extracted images may be named such that the name includes a reference (e.g., subscript) corresponding to the line number.

The word image extraction module 204 may receive textual line images directly from the textual line image extraction module 203, or from the database 209. The word image extraction module 204 may then extract word images along with corresponding word numbers from each of the textual line images. The word image extraction module 204 may first analyze each of the textual line images so as to identify words from the textual line image. For example, in order to identify the words, the word image extraction module 204 may determine contiguous stretches of vertical non-textual spaces in the greyscale image or the binarized textual line image. Each of the contiguous stretches of vertical non-textual spaces may include a number of vertical non-textual bins in excess of or equal to a first predetermined vertical threshold. It should be noted that a vertical bin may be a continuous stretch of pixels from the upper edge of textual line image to the lower edge of the textual line image. Thus, all the pixels in a particular vertical bin may correspond to a particular column of the textual line image (i.e. all the pixels in a vertical bin have the same x co-ordinate). A vertical non-textual bin may consist of almost all non-text pixels (i.e., white pixels in the greyscale image, or black pixels in the binarized image). Further, in some embodiments, the first predetermined vertical threshold may be determined based on an analysis of the textual image or an analysis of the textual line image.

Further, the word image extraction module 204 may extract image of each of the identified words. For example, the word image extraction module 204 may determine a mean horizontal coordinate of the pixels in each of the contiguous stretches of vertical non-textual spaces, and segment the textual line image into word images based on the mean horizontal coordinate of each of the contiguous stretches of vertical non-textual spaces. In some embodiments, the mean horizontal co-ordinate may be determined by averaging the horizontal co-ordinates of all the pixels in the vertical non-textual bins between two words. Thus, using the mean horizontal co-ordinate, each of the textual line images may be segmented into a plurality of images such that each image may represent a word in a given textual line. The word image extraction module 204 may then store extracted images of the words, in the database 209, as separate images along with corresponding line numbers and corresponding word numbers. In some embodiments, each of the extracted images may be named such that the name includes two references (e.g., two subscripts) corresponding to the line number and the word number.

By way of an example, starting from the left edge of the textual line image, the word image extraction module 204 may move towards the right. When a vertical bin of non-text pixels only (e.g., black only pixels in the binarized image) is encountered, the word image extraction module 204 may move towards the right until a vertical bin with some text pixels is encountered. Once a vertical bin with text pixel is encountered, the mean horizontal co-ordinate of the non-text pixels between two words may be determined. Additionally, an average number of the vertical non-textual bins between two words may be determined for each textual line image. This average may be employed as the first pre-determined threshold to find the words in the textual line images. As will be appreciated, the first pre-determined threshold may be used to differentiate the space between two words vis-à-vis the space between two characters. Thus, with the mean horizontal co-ordinates the textual line image may be segmented into individual word images. As stated above, each of the textual line images may undergo the above process to extract word images of all the words in the textual image 208. Each of the extracted word images may be stored with a name having two subscripts referring to the textual line number and the word position in that particular line number.

The character image extraction module 205 may receive word images directly from the word image extraction module 204, or from the database 209. The character image extraction module 205 may then extract character images along with corresponding character numbers from each of the word images. The character image extraction module 205 may first analyze each of the word images so as to identify words from the word image. For example, as above, in order to identify the characters, the character image extraction module 205 may determine contiguous stretches of vertical non-textual spaces in the greyscale image or the binarized word image. Each of the contiguous stretches of vertical non-textual spaces may include a number of vertical non-textual bins. It should be noted that there may be no minimum threshold or a lesser threshold for the number of vertical non-textual bins between two characters. For example, in some embodiments, any number of vertical non-textual bins between two characters in the word image may be sufficient to identify the character and extract the character images. Alternatively, in some embodiments, the number of vertical non-textual bins between two characters in the word image may be less than the first pre-determined vertical threshold, or in excess of or equal to a second predetermined vertical threshold but less than the first predetermined vertical threshold. Further, in some embodiments, the second predetermined vertical threshold may be determined based on an analysis of the textual image, or an analysis of the textual line image, or an analysis of the word image. It should be noted that a vertical bin may be a continuous stretch of pixels from the upper edge of textual line image to the lower edge of the word image. Thus, all the pixels in a particular vertical bin may correspond to a particular column of the word image (i.e. all the pixels in a vertical bin have the same x co-ordinate). A vertical non-textual bin may consist of almost all non-text pixels (i.e., white pixels in the greyscale image, or black pixels in the binarized image).

Further, the character image extraction module 205 may extract image of each of the identified characters. For example, the character image extraction module 205 may determine a mean horizontal coordinate of the pixels in each of the contiguous stretches of vertical non-textual spaces, and segment the word image into character images based on the mean horizontal coordinate of each of the contiguous stretches of vertical non-textual spaces. In some embodiments, the mean horizontal co-ordinate may be determined by averaging the horizontal co-ordinates of all the pixels in the vertical non-textual bins between two characters. Thus, using the mean horizontal co-ordinate, each of the word images may be segmented into a plurality of images such that each image may represent a character in a given word. The character image extraction module 205 may then store extracted images of the characters, in the database 209, as separate images along with corresponding line numbers, corresponding word numbers, and corresponding character numbers. In some embodiments, each of the extracted images may be named such that the name includes three references (e.g., three subscripts) corresponding to the line number, the word number, and the character number.

In short, the character image extraction module 205 may process each word image so as to extract the individual characters in the word image by following a process similar to the extraction of word images from the textual line image by the word image extraction module 204, the primary difference being the first pre-determined vertical threshold vis-à-vis no minimum threshold or the second pre-determined vertical threshold. As will be appreciated, the second pre-determined vertical threshold (i.e., number of vertical non-textual bins between two characters) may be less than the first pre-determined vertical threshold (i.e., number of vertical non-textual bins between two words).

By way of an example, starting from the left edge of the word image, the character image extraction module 205 may move towards the right. When a vertical bin of non-text pixels only (e.g., black only pixels in the binarized image) is encountered, the character image extraction module 205 may move towards the right until a vertical bin with some text pixels is encountered. Once a vertical bin with text pixel is encountered, the mean horizontal co-ordinate of the non-text pixels between two characters may be determined. Each word image may then be segmented into individual character images based on the determined mean horizontal co-ordinate. Additionally, in some embodiments, an average number of the vertical non-textual bins between two characters may be determined for each word image. This average may be employed as the second pre-determined threshold to find the characters in the word images. As stated above, the first pre-determined threshold in conjunction with the second pre-determined threshold may be used to differentiate the space between two words vis-à-vis the space between two characters.

Thus, the textual line image extraction module 203 in conjunction with the word image extraction module 204 and the character image extraction module 205 may provide character images along with corresponding position indices from the received textual image 208. As will be appreciated, a position index of a character image may include a line number, a word number, and a character number of the character image within the textual image. In some embodiments, the OCR engine 200 may further include a page image extraction module for extracting a page number of the character image. As will be appreciated, the page image extraction module may perform operations prior to the textual line image extraction module 203. In such embodiments, the position index of the character image may include the page number, the line number, the word number, and the character number of the character image within the textual image. Similarly, in some embodiments, the OCR engine 200 may further include a row image extraction module and a column image extraction module for extracting a row number and a column number respectively of the character image. Again, as will be appreciated, the row image extraction module and the column image extraction module may perform operations prior to the textual line image extraction module 203. In such embodiments, the position index of the character image may include the row number, the column number, the line number, the word number, and the character number of the character image within the textual image. It should be noted that the row image extraction module and the column image extraction module may perform operations when the image pre-processing module 202 detects a tabular image in the received textual image 208 or when the user manually indicates so.

The character recognition module 206 may provide the capability to identify or recognize the individual characters from the character images using an OCR algorithm. The character recognition module 206 may receive character images directly from the character image extraction module 205, or from the database 209. The character recognition module 206 may then determine characters corresponding to the character images using the OCR algorithm. In some embodiments, the OCR algorithm may be machine learning algorithms (e.g., TensorFlow) or an OCR software application (e.g., Tesseract) that is configured to recognize a pre-defined set of characters. It should be noted that the character may include, but is not limited to, an alphabet, a number, a special character, or a symbol in any of the written language. Further, the character recognition module 206 may generate a file of identified characters along with position indices or names of the corresponding character images, and may then store the file in the database 209.

The character positioning module 207 may receive the file directly from the character recognition module 206, or from the database 209. The character positioning module 207 may then generate text data 210 by positioning the characters based on the position indices of the corresponding character images. In some embodiments, the character positioning module 207 may analyze the individual characters and the position indices of the corresponding character images so as to position each of the identified individual character in their respective textual line, word, and character positions. Alternatively, in some embodiments, the character positioning module 207 may analyze the individual characters and the names of corresponding character images so as to derive position indices (referred to in the name) of the corresponding character images. The character positioning module 207 may then position each of the identified individual character in their respective textual line, word, and character positions based on the position index of the character.

In some embodiments, the character positioning module 207 may sort the identified characters in ascending order based on their line numbers, followed by their word numbers, and followed by the character numbers. The character positioning module 207 may then compare a line number of a character with a line number of preceding character. If the line number of the character is greater than the line number of preceding character, then the character positioning module 207 may place the character in next line. However, if the line number of the character is same as the line number of preceding character, then the character positioning module 207 may compare a word number of a character with a word number of preceding character. If the word number of the character is greater than the word number of preceding character, then the character positioning module 207 may place the character after a space. However, if the word number of the character is same as the word number of preceding character, then the character positioning module 207 may place the character next to the preceding character. It should be noted that the line number or the word number of the character cannot be less than those of preceding character as the characters are already stored in ascending order of their line numbers, word numbers, and character numbers.

The generated text data 210 may be stored in the database 209. Further, the generated text 210 may be outputted via any standard application (e.g., Adobe Acrobat, Notepad, MS Word, etc.) and presented to the user via any standard output device (e.g., display device, etc.). As will be appreciated by those skilled in the art, all such aforementioned modules 201-207 may be represented as a single module or a combination of different modules. Further, as will be appreciated by those skilled in the art, each of the modules 201-207 may reside, in whole or in parts, on one device or multiple devices in communication with each other.

It should be noted that the OCR engine 200 may be implemented in programmable hardware devices such as programmable gate arrays, programmable array logic, programmable logic devices, and so forth. Alternatively, the OCR engine 200 may be implemented in software for execution by various types of processors. An identified engine of executable code may, for instance, include one or more physical or logical blocks of computer instructions which may, for instance, be organized as an object, procedure, function, module, or other construct. Nevertheless, the executables of an identified engine need not be physically located together, but may include disparate instructions stored in different locations which, when joined logically together, include the engine and achieve the stated purpose of the engine. Indeed, an engine of executable code could be a single instruction, or many instructions, and may even be distributed over several different code segments, among different applications, and across several memory devices.

As will be appreciated by one skilled in the art, a variety of processes may be employed for performing OCR and generating text data. For example, the exemplary system 100 and the associated OCR engine 200 may perform OCR and may subsequently generate text data by the processes discussed herein. In particular, as will be appreciated by those of ordinary skill in the art, control logic and/or automated routines for performing the techniques and steps described herein may be implemented by the system 100 and the associated OCR engine 200, either by hardware, software, or combinations of hardware and software. For example, suitable code may be accessed and executed by the one or more processors on the system 100 to perform some or all of the techniques described herein. Similarly application specific integrated circuits (ASICs) configured to perform some or all of the processes described herein may be included in the one or more processors on the system 100.

Figure 3:
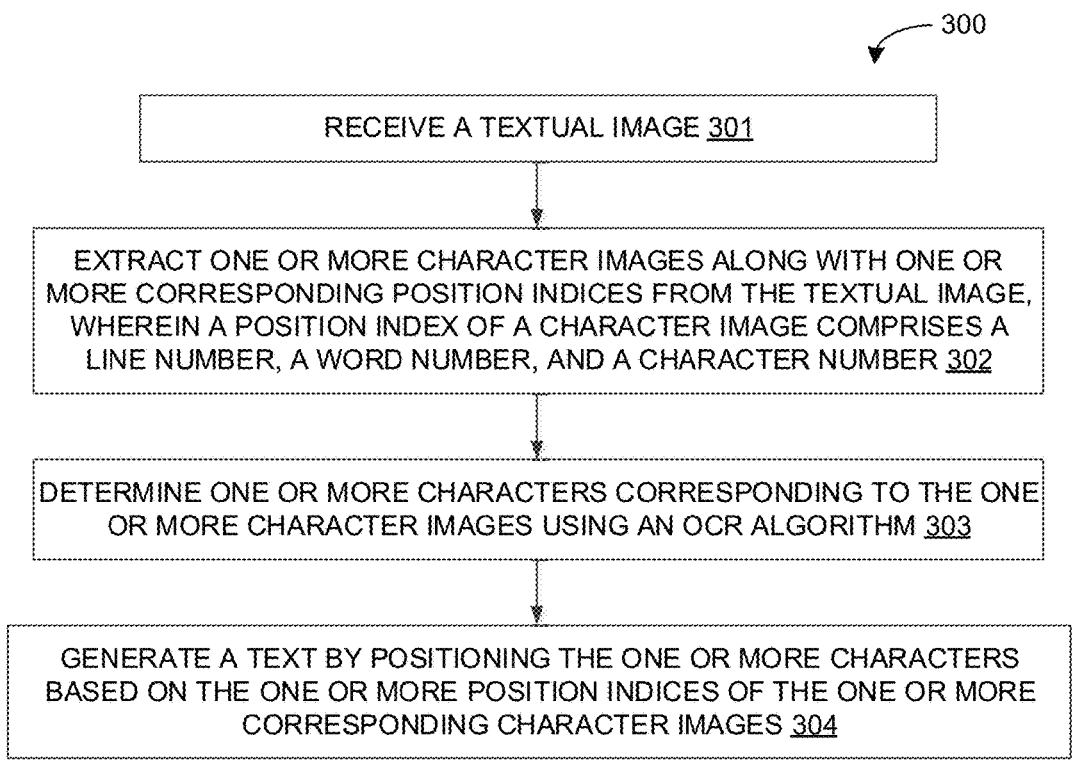
FIG. 3 is a flow diagram of an exemplary process for performing OCR in accordance with some embodiments of the present disclosure.

For example, referring now to FIG. 3, exemplary control logic 300 for performing OCR via a system, such as system 100, is depicted via a flowchart in accordance with some embodiments of the present disclosure. As illustrated in the flowchart, the control logic 300 may include the steps of receiving a textual image at step 301, extracting one or more character images along with one or more corresponding position indices from the textual image at step 302, determining one or more characters corresponding to the one or more character images using an OCR algorithm at step 303, and generating a text by positioning the one or more characters based on the one or more position indices of the one or more corresponding character images at step 304. It should be noted that a position index of a character image may include a line number, a word number, and a character number of the character within the textual image. In some embodiments, the position index of the character image may further include at least one of a page number, a row number, or a column number.

In some embodiments, the control logic 300 may further include the step of pre-processing the textual image. The pre-processing of the textual image may include at least one of converting the textual image into a greyscale image, binarizing the greyscale image, removing noise from the greyscale image, or correcting distortions in the greyscale image. Additionally, in some embodiments, extracting one or more character images at step 302 may include the steps of extracting one or more textual line images along with one or more corresponding line numbers from the textual image, extracting one or more word images along with one or more corresponding word numbers from each of the one or more textual line images, and extracting the one or more character images along with one or more corresponding character numbers from each of the one or more word images.

In some embodiments, extracting the one or more textual line images along with the one or more corresponding line numbers may include the steps of analyzing the textual image to determine one or more contiguous stretches of horizontal non-textual spaces, determining a mean vertical coordinate of the non-text pixels in each of the one or more contiguous stretches of horizontal non-textual spaces, segmenting the textual image into one or more textual line images based on the mean vertical coordinate of each of the one or more contiguous stretches of horizontal non-textual spaces, and storing each of the one or more textual line images along with a corresponding line number. It should be noted that each of the one or more contiguous stretches of horizontal non-textual spaces may include a number of horizontal non-textual bins. Further, it should be noted that each of the horizontal non-textual bins may consist of non-text pixels. In some embodiments, the number of horizontal non-textual bins may be in excess of or equal to a predetermined horizontal threshold. Further, in some embodiments, the predetermined horizontal threshold may be determined based on an analysis of the textual image.

Further, in some embodiments, extracting the one or more word images along with the one or more corresponding word numbers may include the steps of analyzing each of the one or more textual line images to determine one or more contiguous stretches of vertical non-textual spaces, determining a mean horizontal coordinate of the non-text pixels in each of the one or more contiguous stretches of vertical non-textual spaces, segmenting the textual line image into one or more word images based on the mean horizontal coordinate of each of the one or more contiguous stretches of vertical non-textual spaces, and storing each of the one or more word images along with a corresponding line number and a corresponding word number. It should be noted that each of the one or more contiguous stretches of vertical non-textual spaces may include a number of vertical non-textual bins in excess of or equal to a first predetermined vertical threshold. Further, it should be noted that each of the vertical non-textual bins may consist of non-text pixels. As will be appreciated, in some embodiments, the first predetermined vertical threshold may be determined based on an analysis of the textual image or an analysis of the textual line image.

Moreover, in some embodiments, extracting the one or more character images along with one or more corresponding character numbers may include the steps of analyzing each of the one or more word images to determine one or more contiguous stretches of vertical non-textual spaces, determining a mean horizontal coordinate of the non-text pixels in each of the one or more contiguous stretches of vertical non-textual spaces, segmenting the word image into one or more character images based on the mean horizontal coordinate of each of the one or more contiguous stretches of vertical non-textual spaces, and storing each of the one or more character images along with a corresponding line number, a corresponding word number, and a corresponding character number. It should be noted that each of the one or more contiguous stretches of vertical non-textual spaces may include a number of vertical non-textual bins. Further, it should be noted that each of the vertical non-textual bins may consist of non-text pixels. As will be appreciated, in some embodiments, the number of vertical non-textual bins may be less than the first pre-determined vertical threshold, or in excess of or equal to a second predetermined vertical threshold but less than the first pre-determined vertical threshold. Further, in some embodiments, the second predetermined vertical threshold may be determined based on an analysis of the textual image, an analysis of the textual line image, or an analysis of the word image.

In some embodiments, positioning the one or more characters at step 304 may include the step of sorting the one or more characters in ascending order based on the one or more line numbers, followed by the one or more word numbers, and followed by the one or more character numbers. Positioning the one or more characters at step 304 may further include the steps of comparing a line number of a character with a line number of preceding character, placing the character in next line upon determining the line number of the character to be greater than the line number of preceding character, and comparing a word number of a character with a word number of preceding character upon determining the line number of the character to be same as the line number of preceding character. Positioning the one or more characters at step 304 may further include the steps of placing the character after a space upon determining the word number of the character to be greater than the word number of preceding character, and placing the character next to the preceding character upon determining the word number of the character to be same as the word number of preceding character.

Figure 4:
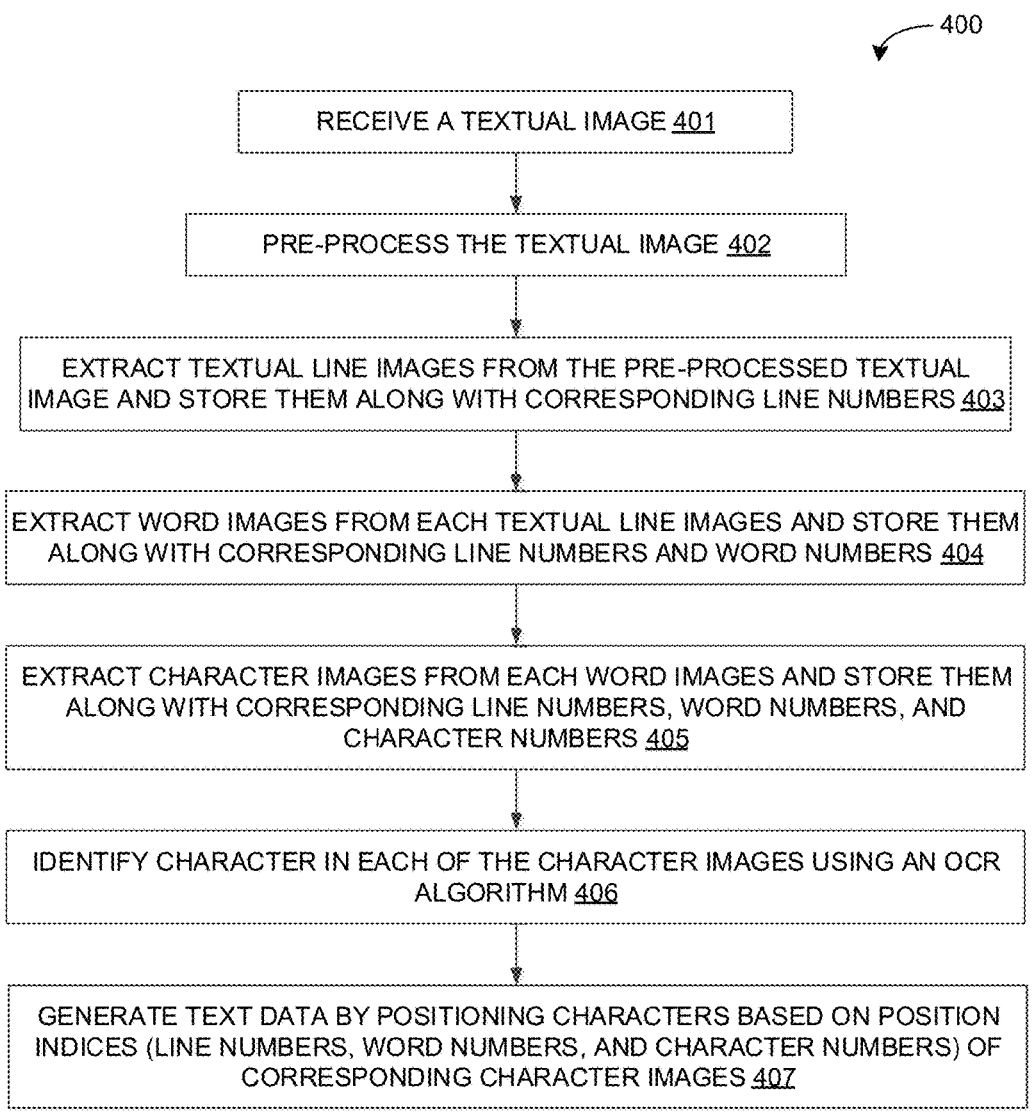
FIG. 4 is a flow diagram of a detailed exemplary process for performing OCR in accordance with some embodiments of the present disclosure.

Referring now to FIG. 4, exemplary control logic 400 for performing OCR is depicted in greater detail via a flowchart in accordance with some embodiments of the present disclosure. As illustrated in the flowchart, the control logic 400 may receive a textual image from a user, an application, a database, or an image capturing device at step 401. If not already stored, the received textual image may be stored in the database. The control logic 400 may then pre-process the received textual image for subsequent analysis and processing at step 402. The pre-processing may include, but is not limited to, performing grey-scale conversion of the textual image, filtering noise from the greyscale image, correcting orientation of the greyscale image, correcting distortion in the greyscale image, binarizing the greyscale image, and so forth. The pre-processed image may be stored in the database.

The control logic 400 may further identify a number of textual line images in the pre-processed textual image, and may extract each of the textual line images along with a corresponding line number from the pre-processed textual image at step 403. The extracted images of the textual lines may be stored in the database as separate images along with corresponding line numbers. In some embodiments, the name of the extracted textual line image may include a subscript representing the textual line number.

The control logic 400 may further identify a number of word images in each of the textual line images, and may extract each of the word images along with a corresponding word number from each of the textual line images at step 404. The extracted images of the words may be stored in the database as separate images along with corresponding line numbers and corresponding word numbers. In some embodiments, the name of the extracted word image may include two subscripts representing the textual line number to which the word belongs, and the word number in the textual line.

The control logic 400 may further identify a number of character images in each of the word images, and may extract each of the character images along with a corresponding character number from each of the word images at step 405. The extracted images of the characters may be stored in the database as separate images along with corresponding line numbers, corresponding word numbers, and corresponding character numbers. In some embodiments, the name of the extracted character image may include three subscripts representing the textual line number to which the character belongs, the word number to which the character belongs, and the character number in the word.

Additionally, the control logic 400 may identify individual character in each of the character images using an OCR algorithm, and may generate a list of identified characters at step 406. The list may also include position indices of the character images or names of the character images corresponding to the identified characters. The control logic 400 may further generate text data by positioning the characters based on the position indices (e.g., line numbers, word numbers, character numbers, etc.) of the corresponding character images at step 407. In some embodiments, the list of identified characters and the names of the corresponding character images may be analyzed so as to derive position indices of each of the identified characters, and the identified characters may then be positioned based on the position indices so as to generate a text. The generated digital text may be provided to other application or other devices. For example, the generated text may be presented to the user via an application using an output device.

Figure 5A:
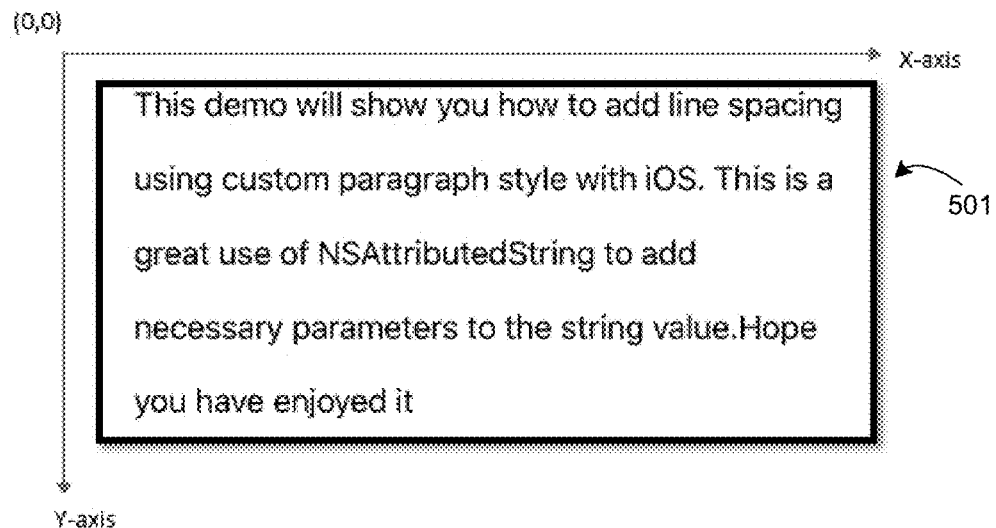

Referring now to FIGS. 5A-5K, an exemplary example of generating an output text data from an input textual image is illustrated in accordance with some embodiments of the present disclosure. FIG. 5A illustrates a textual image 501 with Cartesian co-ordinates. The textual image is a 2D array with rows and columns, where each pixel (i.e., cell in the array) has a particular value that defines the color of the pixel. The origin co-ordinate (0, 0) is illustrated in the upper left corner of the image. The X-axis lies horizontally while the Y-axis lies vertically. As will be appreciated, the co-ordinates (x, y) of each pixel in the textual image 501 play an important role in segmenting the textual line image, the word image and the character image from the input textual image 501.

As stated above, existing techniques employ pixel co-ordinates to position the characters in proper order subsequent to performing OCR. However, such techniques are cumbersome as they require higher processing time and capability. The techniques described in the present disclosure provide for a computationally efficient approach for positioning characters in output text after performing OCR. As will be described in greater detail below, the described techniques provide for extracting positioning parameters (e.g., position indices) of character images while extracting character images from the textual image for performing OCR (e.g., using TensorFlow). Further, in some embodiments, the described techniques provide for extracting positioning parameters (e.g., position indices) of word images while extracting word images from the textual image for performing OCR (e.g., using Tesseract). The positioning parameters may then be employed to position recognized characters or recognized words, as the case may be, with respect to each other so as to generate text.

As will be appreciated, in the input textual image 501, the textual lines are separated by horizontal white spaces between them. Further, the words are separated from each other by vertical white spaces between them, and so are characters. The described techniques may employ this space separation for extracting the characters images from the textual image 501. First, the described techniques may employ the horizontal white spaces to extract textual line images from the textual image 501. Further, the described techniques may employ the vertical white spaces to extract words and the characters.

Figure 5B:
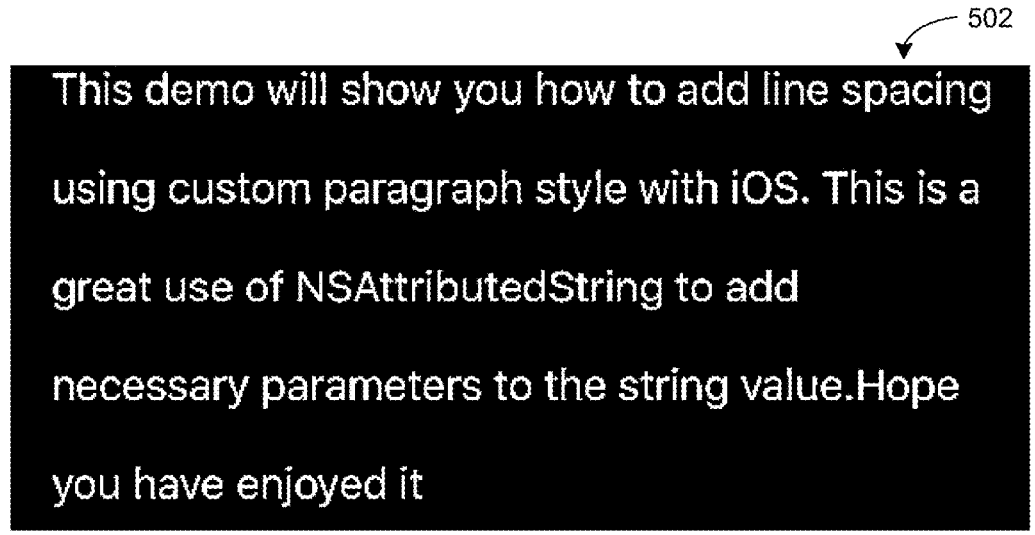

The textual image 501 may be first converted to greyscale image, which may then be binarized. As will be appreciated, there may be pixels with shades of color in the input textual image 501 or several shades of white and black in the input textual image 501 or in the converted greyscale image. It may be, therefore, required to convert this to a binarized image with pixel color either white or black. FIG. 5B illustrates a binarized image 502 having same dimensions (e.g., height and width) as the input textual image 501. As will be appreciated, in the binarized image 502, there may be a number of horizontal bins of black pixels between two lines separating one line from the other. As stated above, a horizontal bin may be a continuous stretch of pixels from the left margin of image to the right margin of the image. Thus, all pixels on a horizontal bin may have the same y co-ordinate. Again, as will be appreciated, if there are white pixels in a horizontal bin, then that bin may belong to a textual line.

The described techniques may identify horizontal bins with only black pixels and their respective co-ordinates. The starting point of a horizontal bin may be on the y axis on the left edge of the binarized image 502, while the ending point of the horizontal bin may be on the y-axis on the right edge of the binarized image 502. Further, there may be several black only horizontal bins between two textual lines. Therefore, a mean vertical co-ordinate may be determined by averaging the y-co-ordinates of all the black only horizontal bins between two textual lines. FIG. 5C illustrates a representative image 503 with multiple lines drawn along the determined mean vertical co-ordinates indicating textual lines in received the textual image 501.

Thus, with the mean vertical co-ordinates, the described techniques may extract textual line images from the binarized image 502. Each of the textual line images may be stored as a separate image with a corresponding line number as its name (e.g., 1.png, 2.png, etc.). FIG. 5D illustrates some of the examples of textual line images 504A, 504B, 504C, and 504D extracted from the binarized textual image 502. The textual line image 504A is an image of first line (i.e., line 1) in the textual image 501 and may be stored as 1.png. Similarly, the textual line images 504B, 504C, and 504D are images of second line (i.e., line 2), third line (i.e., line 3), and fourth line (i.e., line 4) in the textual image 501 and may be stored as 2.png, 3.png, and 4.png respectively. It should be noted that each of the textual line images may be a binarized textual line image extracted from the binarized image 502.

The described techniques may further process each of the binarized textual line images, collectively referred to as 504, to identify the words in the textual line. It should be noted that the extracted binarized textual line images may be processed along with their corresponding line numbers so that the line numbers may be used to name each of the extracted word images. As will be appreciated, in the binarized textual line image 504, there may be a number of vertical bins of black pixels between two words separating one word from the other. As stated above, a vertical bin may be a continuous stretch of pixels from the upper edge of image to the lower edge of the image. Thus, all pixels on a vertical bin may correspond to a column of the image and may have the same x co-ordinate. Again, as will be appreciated, if there are white pixels in a vertical bin, then that bin may belong to a word.

The described techniques may identify vertical bins with only black pixels and their respective co-ordinates. The starting point of a vertical bin may be on the x axis on the upper edge of the binarized textual line image 504, while the ending point of the vertical bin may be on the x-axis on the lower edge of the binarized textual line image 504. Starting from the left edge of the textual line image 504, the described technique may move towards the right. When a vertical bin of black only pixels is encountered, the described techniques may move towards the right until a vertical bin with white pixels is encountered. Once a vertical bin with white pixel is encountered, the mean horizontal co-ordinate of the black only pixels between two words may be determined. FIG. 5E illustrates a representative image 505 with multiple lines drawn along the determined mean horizontal co-ordinates indicating words in the textual line image 504A. Further, an average number of the black pixel only vertical bins between two words may be determined for each of the textual line images 504. As will be appreciated, this average may be used as a first pre-determined vertical threshold to find the words in the textual line image 504. The first pre-determined vertical threshold may also be employed to differentiate the space between words and characters.

Figure 5F:
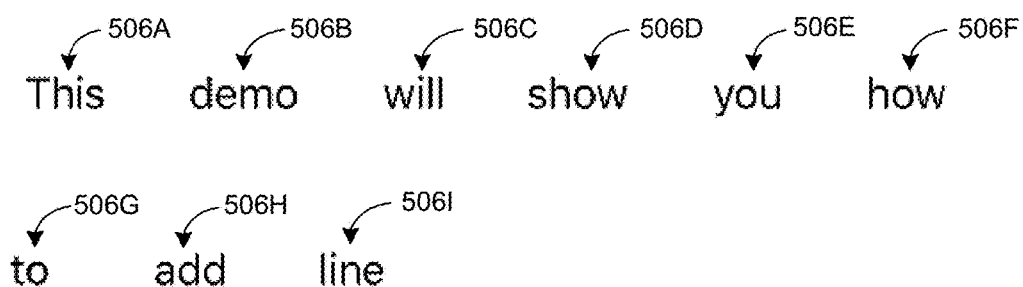

Thus, with the mean horizontal co-ordinates, the described techniques may extract word images from the binarized textual line images 504. Each of the word images may be stored as a separate image with a corresponding line number and a corresponding word number as its name (e.g., 1_1.png, 1_2.png, 2_3.png, etc.). FIG. 5F illustrates some of the examples of word images 506A, 506B, 506C, 506D, 506E, 506F, 506G, 506H, and 506I extracted from the textual line image 504A. The word image 506A is an image of first word (i.e., word 1) in the textual line image 504A of first line (i.e., line 1), and may be stored as 1_1.png. Similarly, the word images 506B, 506C, 506D, 506E, 506F, 506G, 506H, and 506I are images of second word in first line (i.e., line 1, word 2), third word in first line (i.e., line 1, word 3), fourth word in first line (i.e., line 1, word 4), fifth word in first line (i.e., line 1, word 5), sixth word in first line (i.e., line 1, word 6)seventh word in first line (i.e., line 1, word 7), eighth word in first line (i.e., line 1, word 8), and ninth word in first line (i.e., line 1, word 9) in the textual line image 504A, and may be stored as 1_2.png, 1_3.png, 1_4.png, 1_5.png, 1_6.png, 1_7.png, 1_8.png, and 1_9.png respectively. It should be noted that each of the word images may be a binarized word image extracted from the binarized textual line image 504.

Figure 5G:
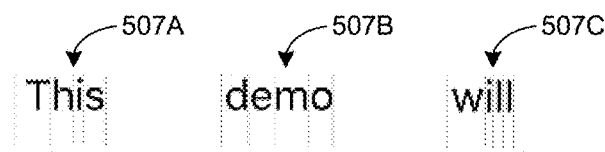

The described techniques may further process each of the binarized word images, collectively referred to as 506, to identify the characters in the word. It should be noted that the extracted binarized word images may be processed along with their corresponding line numbers and their corresponding word numbers so that the line number and the word number may be used to name each of the extracted character images. As will be appreciated, this character image extraction process is similar to the word image extraction process with a primary difference being that there may be no minimum threshold or a lesser threshold for the number of vertical bins between two characters. For example, in some embodiments, any number of the black pixel only vertical bins between two characters in the word image may be sufficient to identify the character and extract the character image. Alternatively, in some embodiments, the number of the black pixel only vertical bins between two characters in the word image may be less than the first pre-determined vertical threshold, or more than or equal to a second pre-determined vertical threshold but less than the first pre-determined vertical threshold. As above, the mean horizontal co-ordinate of the black only pixels between two characters may be determined. FIG. 5G illustrates representative images 507A, 507B, and 507C with multiple lines drawn along the determined mean horizontal co-ordinates indicating characters in the word images 506A, 506B, and 506C respectively.

Figure 5H:
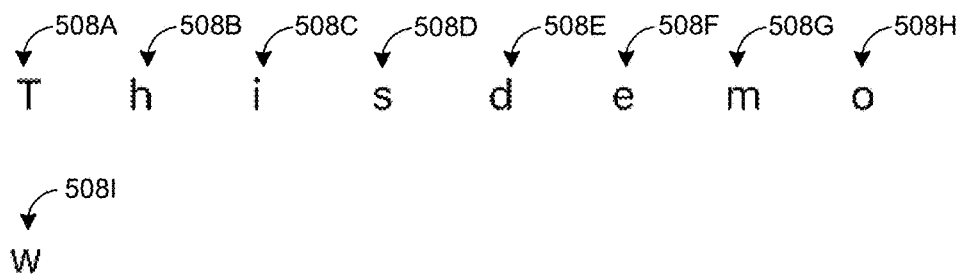

Thus, with the mean horizontal co-ordinates, the described techniques may extract character images from the binarized word images 506. Each of the character images may be stored as a separate image with a corresponding line number, a corresponding word number, and a corresponding character number as its name (e.g., 1_1_1.png, 1_2_1.png, 2_3_4.png, etc.). FIG. 5H illustrates some of the examples of character images 508A, 508B, 508C, 508D, 508E, 508F, 508G, 508H, and 508I extracted from the word images 506A, 506B, and 506C respectively. The character image 508A is an image of first character (i.e., character 1) in the word image 506A of first word (i.e., word 1) in first line (i.e., line 1), and may be stored as 1_1_1.png. Similarly, the character images 508B, 508C, 508D, 508E, 508F, 508G, 508H, and 508I are images of second character in first word in first line (i.e., line 1, word 1, character 2), third character in first word in first line (i.e., line 1, word 1, character 3), fourth character in first word in first line (i.e., line 1, word 1, character 4), first character in second word in first line (i.e., line 1, word 2, character 1), second character in second word in first line (i.e., line 1, word 2, character 2), third character in second word in first line (i.e., line 1, word 2, character 3), fourth character in second word in first line (i.e., line 1, word 2, character 4), and first character in third word in first line (i.e., line 1, word 3, character 1) in the word images 506A, 506B, and 506C respectively, and may be stored as 1_1_2.png, 1_1_3.png, 1_1_4.png, 1_2_1.png, 1_2_2.png, 1_2_3.png, 1_2_4.png, and 1_3_1.png respectively. It should be noted that each of the character images may be a binarized character image extracted from the binarized word image 506.

Figure 5I:
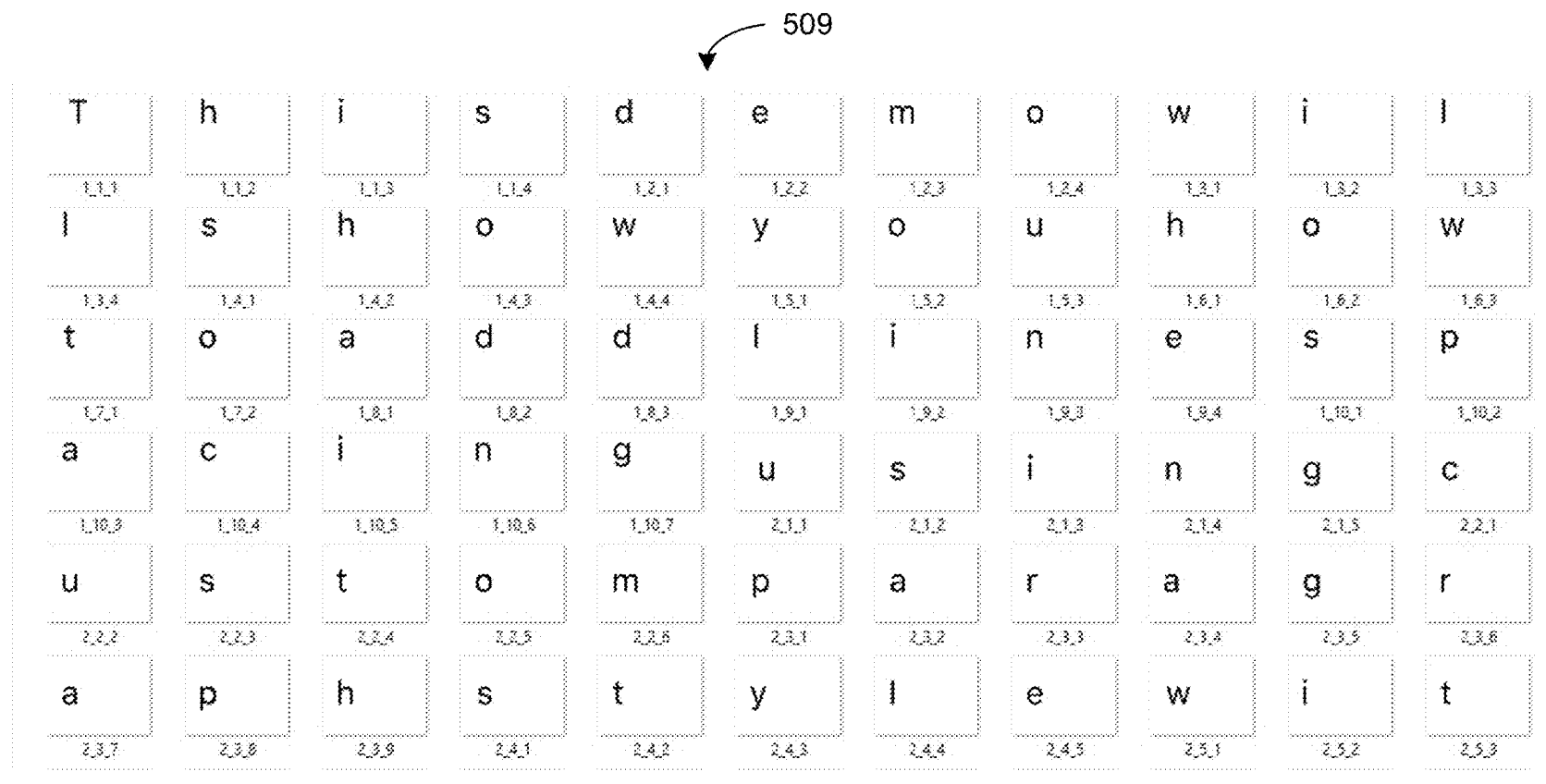

FIG. 5I illustrates an assorted list 509 of character images, collectively referred to as 508, extracted from the binarized textual image 502. Once the character images 508 have been extracted along with their corresponding position indices, the described techniques may further perform OCR of each of the character images 508. In some embodiments, the extracted character images 508 may be provided as input to the python program with machine learning library TensorFlow for OCR. As will be appreciated, TensorFlow is an open source library used for OCR that processes an input character image and provides the recognized character. After all the character images of characters are run through OCR, the output may be a file with a list of names of character images and corresponding identified characters. FIG. 5J illustrates the output of the OCR algorithm as a list 510 with names of character images in one column and corresponding identified characters in the adjacent column. In some embodiments, the output file may be a excel file with the class name of the image detected by TensorFlow in a first column, character image name in a second column, and the corresponding identified character in a third column.

The described techniques may further position the identified characters in a proper order so as to generate text. As stated above, the character image name may indicate the position of the corresponding character in the text. For example, '1_2_3.png' may indicate that the character is the third character in the second word in the first line. The character image name may, therefore, be broken down to individual numbers to be able to access the position information for the corresponding character. For example, the name of the character image may be dissected to extract the line number, the word number, and the character number. In some embodiments, python scripts may be employed to extract position indices from the name of the character image. As will be appreciated, the extracted position parameters may then be employed to decide position of each of the characters in the output text file. The characters may then be placed in the order of their position.

In some embodiments, all the characters in the list are sorted based on their position indices in ascending order based on their line numbers, followed by their word numbers, and followed by their character numbers. Every time a character is read for writing it to the text file, the line number of the read character is compared to the line number of previously written character. If the line number of the read character is more than that of previously written character, then the read character is written in next line in the text file. However, if the line number of the read character is same as that of previously written character, then the word number of the read character is compared to the word number of previously written character. If the word number of the read character is more than that of previously written character, then the read character is written in the text file after a writing a space in the text file. However, if the word number of the read character is same as that of previously written character, then the read character is written next to the previously written character in the text file. Thus, all the characters may be arranged in a proper order, and the final output is generated as the text file. FIG. 5K illustrates the final text file 511 after positioning of the identified characters as described above.

Thus, the individual character images may be extracted from the textual image and may be stored as separate images. Each of the individual character image's name may include three subscripts representing position information of the character. The position information may include the line number, the word number, and the character number, and may precisely indicate the position of the character image in the textual image. Each character may then be recognized from the individual character image, using machine learning algorithm (e.g., TensorFlow) or OCR software application (e.g., Tesseract), to generate a list containing the character identified and the respective character image name. The digital text may then be generated by analyzing the list of individual characters and their corresponding character image names, and by positioning the identified individual characters into their respective line, word, and character position based on the corresponding character image names.

Figure 6A:
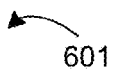
FIGS. 6A-6O illustrate an exemplary example of generating an output tabular text data from an input tabular textual image in accordance with some embodiments of the present disclosure.

Referring now to FIGS. 6A-6O, an exemplary example of generating an output tabular text data from an input tabular textual image is illustrated in accordance with some embodiments of the present disclosure. In the illustrated example, the recognized characters may be positioned in a proper table format after OCR has been performed for a table image, using TenserFlow or Tesseract OCR software application. FIG. 6A illustrates a tabular textual image 601. In the illustrated tabular textual image 601, each cell belongs to a particular row and a particular column. For instance, the cell with content 'Our system' belongs to first column of second row. Within each cell, there are textual lines. In each textual line, there are several words. In each word, there are several characters. Thus, each character in the image may belong to a specific word in a specific line, and that line may belong to a row and column. For example, 'O ' in 'Our system' is the first letter of the first word in the first line in the first column of second row. Similarly, 's' in 'Our system' is the first letter of the second word in the first line in the first column of second row. If described techniques may determine above-mentioned position information of each character image so as to position them in a proper table format.

Figure 6B:
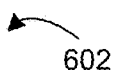

The horizontal and vertical lines of the table in the tabular textual image 601 may be detected using probabilistic Hough transform. FIG. 6B illustrates a representative image 602 with detected horizontal and vertical lines of the table in the tabular textual image 601. The detected lines may then be removed from the tabular textual image 601. FIG. 6C illustrates an output image 603 after removing the detected horizontal and vertical lines.

The output image 603 may be first converted to greyscale image, which may then be binarized. FIG. 6D illustrates a binarized image 604. As will be appreciated, in the binarized image 604, there may be a number of horizontal bins of black pixels between two rows separating one row from the other. A mean vertical co-ordinate may be determined by averaging the y-co-ordinates of all the black only horizontal bins between two rows. FIG. 6E illustrates a representative image 605 with multiple lines drawn along the determined mean vertical co-ordinates indicating rows in the binarized tabular textual image 604. With the mean vertical co-ordinates, row images may be extracted from the binarized image 604. Each of the row images may be stored as a separate image with a corresponding row number as its name (e.g., 1.png, 2.png, etc.). FIG. 6F illustrates some of the examples of row images 606A, 606B, 606C, 606D, and 606E extracted from the binarized image 604. The row image 606A is an image of first row (i.e., row 1) in the binarized image 604 and may be stored as 1.png. Similarly, the row images 606B, 606C, 606D, and 606E are images of second row (i.e., row 2), third row (i.e., row 3), fourth row (i.e., row 4), and fifth row (i.e., row 5) in the binarized image 604 and may be stored as 2.png, 3.png, 4.png, and 5.png respectively. It should be noted that each of the row images may be a binarized row image extracted from the binarized image 604.

Figure 6H:
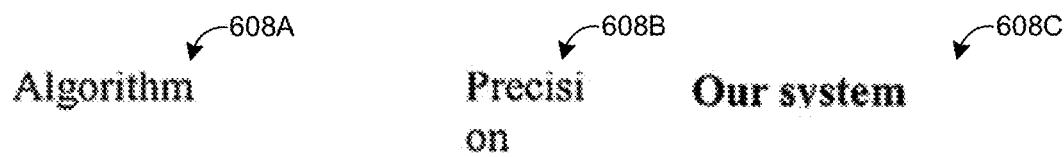

Each of the binarized row images, collectively referred to as 606, may now be processed to extract table cells or columns. It should be noted that the extracted binarized row images may be processed along with their corresponding row numbers so that the row number may be employed to name each of the extracted cell images. As will be appreciated, in the binarized row image 606, there may be a number of vertical bins of black pixels between two cells separating one cell from the other. A mean horizontal co-ordinate may be determined by averaging the x-co-ordinates of all the black only vertical bins between two cells. FIG. 6G illustrates representative images 607A-607E with multiple lines drawn along the determined mean vertical co-ordinates indicating cells in each of the binarized row images 606. With the mean horizontal co-ordinates, cell images may be extracted from the binarized row image 606. Each of the cell images may be stored as a separate image with a corresponding row number and a corresponding cell number as its name (e.g., 1_1.png, 2_1.png, etc.). FIG. 6H illustrates some of the examples of cell images 608A, 608B, and 608C extracted from the row image 606A and 606B. The row image 608A is an image of first cell (i.e., cell 1) in the row image 606A of first row (i.e., row 1), and may be stored as 1_1.png. Similarly, the cell images 608B, and 608C are images of second cell in first row (i.e., row 1, cell 2), and first cell in second row (i.e., row 2, cell 1) in the binarized row image 606A and 606B, and may be stored as 1_2.png, and 2_1.png respectively. It should be noted that each of the cell images may be a binarized cell image extracted from the binarized row image 606.

Figure 6I:
Figure 6J:
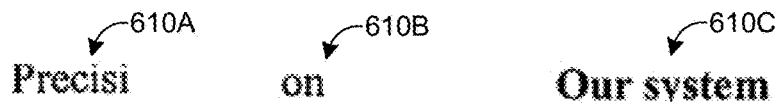
Figure 6K:
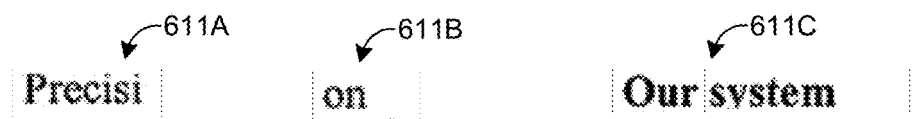
Figure 6L:

Once the cell images are extracted, the techniques may follow process described in FIGS. 5C-5H so as to extract textual line images, word images, and the character images from each of the cell image. Thus, each of the binarized cell images, collectively referred to as 608, may now be processed to extract textual line images using horizontal bins of black pixels between two textual lines and a mean vertical coordinate. FIG. 6I illustrates representative images 609A and 609B with multiple lines drawn along the determined mean vertical co-ordinates indicating textual lines in the cell images 608B and 608C respectively. FIG. 6J illustrates some of the examples of binarized textual line images 610A, 610B, and 610C extracted from the cell image 608B, and 608C. The textual line image 610A representing first line (i.e., line 1) in the cell image of second cell (i.e., cell 2) in the first row (i.e., row 1) may be named as 1_2_1.png. Similarly, textual line image 610B and 610C representing second line in second cell in first row (i.e., row 1, cell 2, line 2) and first line in first cell in second row (i.e., row 2, cell 1, line 1) may be stored as 1_2_2.png and 2_1_1.png respectively FIG. 6K illustrates representative images 611A, 611B, and 611C with multiple lines drawn along the determined mean horizontal co-ordinates indicating words in the binarized textual line images 610A, 610B, and 610C respectively. FIG. 6L illustrates some of the examples of word images 612A, 612B, 612C, and 612D extracted from the binarized textual line images 610A, 610B, and 610C. The word image 612A is an image of first word (i.e., word 1) in the textual line image 610A of first line (i.e., line 1) in second cell (i.e., cell 2) in first row (i.e., row 1), and may be stored as 1_2_1_1.png. Similarly, words images 612B, 612C, and 612D are images of first word in second line in second cell in first row (i.e., row 1, cell 2, line 2, word 1), first word in first line in first cell in second row (i.e., row 2, cell 1, line 1, word 1), and second word in first line in first cell in second row (i.e., row 2, cell 1, line 1, word 2) in the textual line image 609, and may be stored as 1_2_2_1.png, 2_1_1_1.png, and 2_1_1_2.png respectively. It should be noted that each of the word images may be a binarized word image extracted from the binarized textual line image 609.

Further, as described above in greater detail in conjunction with FIG. 5, each of the binarized word images, collectively referred to as 612, may be processed to extract character images using vertical bins of black pixels between two characters and a mean horizontal coordinate. Each of the extracted character images may be stored as a separate image with a corresponding row number, cell number, line number, word number, and character number as its name (e.g., 1_2_1_1_1.png, 1_2_1_1_2.png, 2_1_1_1_1.png, etc.). The extracted character images may then be provided to an OCR algorithm (e.g., TensorFlow) for character recognition. The output of the OCR algorithm may be a list with names of character images in one column and corresponding identified characters in the adjacent column. The identified characters may now be positioned in a proper order so as to generate tabular text. As stated above, the character image name may indicate the position of the corresponding character in the text. For example, '1_2_3_4_5.png' may indicate that the character is the fifth character in the fourth word in the third line of the second cell in the first row. The character image name may, therefore, be broken down to individual numbers in order to access the position information for the corresponding character (i.e., the row number, the cell number, the line number, the word number, and the character number). The extracted position parameters may then be employed to decide position of each of the characters in the output tabular text.

Figure 6M:
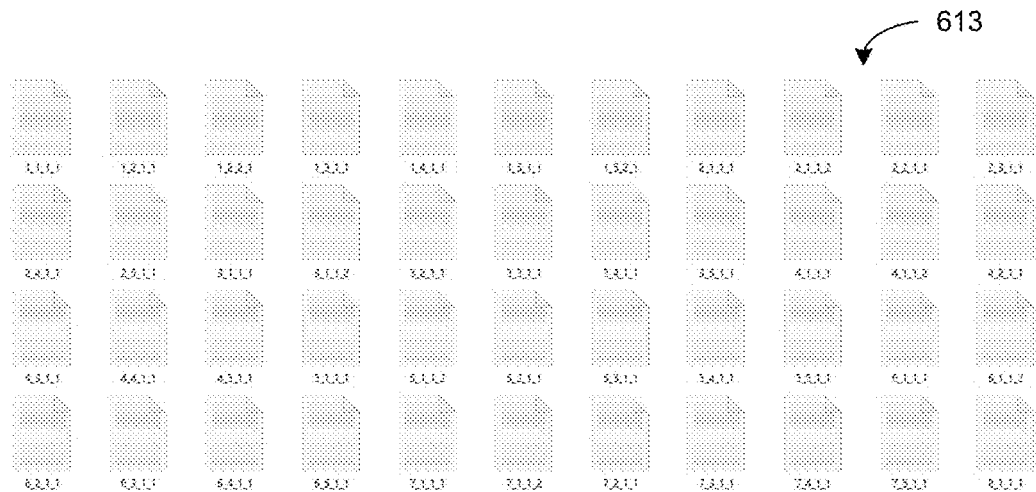
Figure 6N:

Alternatively, as stated above, in some embodiments, the extracted word images may be directly provided (i.e., without extracting character images) to an OCR application (e.g., Tesseract) for word recognition. The output of the OCR application may be a list of text files with recognized words. Further, names of the text files may be that of corresponding word images. FIGS. 6M and 6N illustrate an assorted list of text files, collectively referred to as 613, as the output of OCR application (e.g., Tesseract) and corresponding to the word images extracted from the binarized tabular textual image 604. As illustrated, the text file '1_1_1_1.txt' contains the word 'Algorithm' corresponding to first word in first line in first cell in first row of the tabular text. The identified words in each of the text files may be positioned in a proper order so as to generate tabular text. As stated above, the text file name (i.e., word image name) may indicate the position of the corresponding word in the tabular text. For example, '1_2_3_4.txt', corresponding to word image '1_2_3_4.png', may indicate that the recognized word in the text file is the fourth word in the third line of the second cell in the first row. The text file name (i.e., the word image name) may, therefore, be broken down to individual numbers in order to access the position information for the corresponding word (i.e., the row number, the cell number, the line number, and the word number). In some embodiments, once the text files are generated by the OCR application, python scripts may be employed to read the text file name as well as the file content (i.e., words). The extracted position parameters may then be employed to decide position of each of the words in the output tabular text. FIG. 60 illustrates the final tabular file 616 after positioning of the identified characters or words.

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 7:
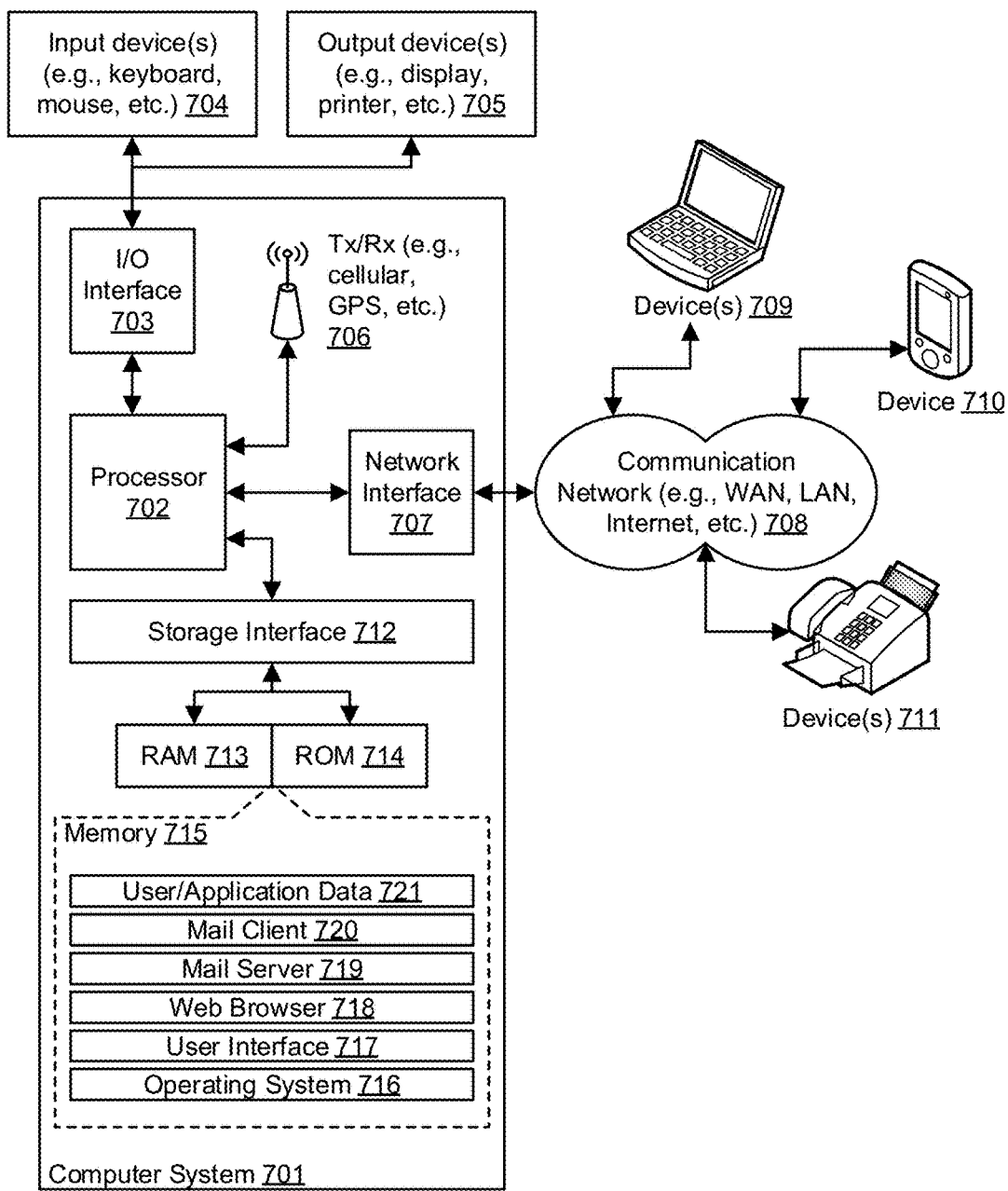
FIG. 7 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 7, a block diagram of an exemplary computer system 701 for implementing embodiments consistent with the present disclosure is illustrated. Variations of computer system 701 may be used for implementing system 100 for performing optical character recognition. Computer system 701 may include a central processing unit ("CPU" or "processor") 702. Processor 702 may include at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 702 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 702 may be disposed in communication with one or more input/output (I/O) devices via I/O interface 703. The I/O interface 703 may employ communication protocols/methods such as, without limitation, audio, analog, digital, monoaural, RCA, stereo, IEEE-1394, near field communication (NFC), FireWire, Camera Link®, GigE, serial bus, universal serial bus (USB), infrared, PS/2, BNC, coaxial, component, composite, digital visual interface (DVI), high-definition multimedia interface (HDMI), RF antennas, S-Video, video graphics array (VGA), IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 703, the computer system 701 may communicate with one or more I/O devices. For example, the input device 704 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, altimeter, gyroscope, proximity sensor, or the like), stylus, scanner, storage device, transceiver, video device/source, visors, etc. Output device 705 may be a printer, fax machine, video display (e.g., cathode ray tube (CRT), liquid crystal display (LCD), light-emitting diode (LED), plasma, or the like), audio speaker, etc. In some embodiments, a transceiver 706 may be disposed in connection with the processor 702. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 702 may be disposed in communication with a communication network 708 via a network interface 707. The network interface 707 may communicate with the communication network 708. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 708 may include, without limitation, a direct interconnection, local area network (LAN), wide area network (WAN), wireless network (e.g., using Wireless Application Protocol), the Internet, etc. Using the network interface 707 and the communication network 708, the computer system 701 may communicate with devices 709, 710, and 711. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 701 may itself embody one or more of these devices.

In some embodiments, the processor 702 may be disposed in communication with one or more memory devices (e.g., RAM 713, ROM 714, etc.) via a storage interface 712. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), STD Bus, RS-232, RS-422, RS-485, I2C, SPI, Microwire, 1-Wire, IEEE 1284, Intel® QuickPathInterconnect, Infini-Band, PCIe, etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 716, user interface application 717, web browser 718, mail server 719, mail client 720, user/application data 721 (e.g., any data variables or data records discussed in this disclosure), etc. The operating system 716 may facilitate resource management and operation of the computer system 701. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 717 may facilitate display, execution, interaction, manipulation, or operation of program components through textual or graphical facilities. For example, user interfaces may provide computer interaction interface elements on a display system operatively connected to the computer system 701, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 701 may implement a web browser 718 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 701 may implement a mail server 719 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 701 may implement a mail client 720 stored program component. The mail client may be a mail viewing application, such as Apple Mail, Microsoft Entourage, Microsoft Outlook, Mozilla Thunderbird, etc.

In some embodiments, computer system 701 may store user/application data 721, such as the data, variables, records, etc. (e.g., textual images, textual line images, word images, character images, position indices, OCR algorithm, recognized characters, generated text, and so forth) as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

As will be appreciated by those skilled in the art, the techniques described in the various embodiments discussed above provide for efficient, effective, and scalable optical character recognition (OCR). There Existing techniques employing erosion followed by contour detection may corrupt the characters (e.g., cut out characters) or lower the quality of the character image. Further, in such techniques the kernel size used for morphological operations may be non-standard and may have to be changed for different images. is no loss of data or information during extraction of character images. The current techniques does not corrupt the character images, nor lower the quality of the image. Thus, the error rate of the described techniques is very low. Further, the described techniques employ vertical and projections to determine the space between sentences or words or characters. By this way, chances of including two words as one words or two letters as one letter is almost negligible. Additionally, the described techniques is language independent and will work for all language irrespective of whether word spacing has been used or not.

The techniques described in the various embodiments discussed above further provide for efficient, effective, and robust generation of text from the recognized characters by positioning characters using image name of characters. The techniques provide for simple procedure for positioning of characters after OCR is done either using machine learning library (e.g., TensorFlow) or any other OCR engine (e.g., Tesseract). Each alphabet has a unique position in the image, which helps in knowing the exact position of the character in the text. In the techniques describe above, when the characters are extracted from the image for OCR, position parameters are associated with each character image. For example, in a simple textual image, the techniques determine the sentence the characters belongs to in the original image, the word the characters belongs to in that particular line, and the position of the characters in that particular word. With the position information for each character, the techniques enable arranging the characters in proper order. In other words, each character image has relevant information in it to put it back in a proper position. The techniques described above does not require pixel co-ordinates of each character or any other complex calculations for positioning characters after identifying the characters. This enables the algorithm to be faster than conventional algorithms, and easier to implement. In other words, the described techniques are computationally and memory efficient. Additionally, the techniques described in the embodiments discussed above is scalable and may be upgraded to be used in other applications. For example, the techniques was easily upgradeable to include two more additional parameters namely row number and column number. These two parameters used in relation with the line number, word number and character position number for table image to text conversion.

The specification has described system and method for optical character recognition and text generation. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for performing optical character recognition (OCR), the method comprising:
   receiving, by one or more processors, a textual image;
   extracting, by the one or more processors, one or more character images along with one or more corresponding position indices from the textual image, wherein a position index of a character image comprises a line number, a word number, and a character number of the character image within the textual image;
   determining, by the one or more processors, one or more characters corresponding to the one or more character images using an OCR algorithm; and
   generating, by the one or more processors, a text by positioning the one or more characters based on the one or more position indices of the one or more corresponding character images, wherein the positioning the one or more characters comprises:
      sorting the one or more characters in ascending order based on the one or more line numbers, followed by the one or more word numbers, and followed by the one or more character numbers;
      comparing a line number of a character with a line number of preceding character;
      upon determining the line number of the character to be greater than the line number of preceding character, placing the character in next line;
      upon determining the line number of the character to be same as the line number of preceding character, comparing a word number of a character with a word number of preceding character;
      upon determining the word number of the character to be greater than the word number of preceding character, placing the character after a space; and
      upon determining the word number of the character to be same as the word number of preceding character, placing the character next to the preceding character.

2. The method of claim 1, further comprising pre-processing the textual image by at least one of:
   converting the textual image into a greyscale image,
   binarizing the greyscale image,
   removing noise from the greyscale image, or
   correcting distortions in the greyscale image.

3. The method of claim 1, wherein extracting comprises:
   extracting one or more textual line images along with one or more corresponding line numbers from the textual image;
   extracting one or more word images along with one or more corresponding word numbers from each of the one or more textual line images; and
   extracting the one or more character images along with one or more corresponding character numbers from each of the one or more word images.

4. The method of claim 3, wherein extracting the one or more textual line images along with the one or more corresponding line numbers comprises:
   analyzing the textual image to determine one or more contiguous stretches of horizontal non-textual spaces, wherein each of the one or more contiguous stretches of horizontal non-textual spaces comprises a number of horizontal non-textual bins, and wherein each of the horizontal non-textual bins consists of non-text pixels;
   determining a mean vertical coordinate of the non-text pixels in each of the one or more contiguous stretches of horizontal non-textual spaces;
   segmenting the textual image into one or more textual line images based on the mean vertical coordinate of each of the one or more contiguous stretches of horizontal non-textual spaces; and
   storing each of the one or more textual line images along with a corresponding line number.

5. The method of claim 4, wherein the number of horizontal non-textual bins is in excess of or equal to a predetermined horizontal threshold, and wherein the predetermined horizontal threshold is determined based on an analysis of the textual image.

6. The method of claim 3, wherein extracting the one or more word images along with the one or more corresponding word numbers comprises:
   analyzing each of the one or more textual line images to determine one or more contiguous stretches of vertical non-textual spaces, wherein each of the one or more contiguous stretches of vertical non-textual spaces comprises a number of vertical non-textual bins in excess of or equal to a first predetermined vertical threshold, and wherein each of the vertical non-textual bins consists of non-text pixels;
   determining a mean horizontal coordinate of the non-text pixels in each of the one or more contiguous stretches of vertical non-textual spaces;
   segmenting the textual line image into one or more word images based on the mean horizontal coordinate of each of the one or more contiguous stretches of vertical non-textual spaces; and storing each of the one or more word images along with a corresponding line number and a corresponding word number.

7. The method of claim 6, wherein the first predetermined vertical threshold is determined based on an analysis of the textual image or an analysis of the textual line image.

8. The method of claim 3, wherein extracting the one or more character images along with one or more corresponding character numbers comprises:
analyzing each of the one or more word images to determine one or more contiguous stretches of vertical non-textual spaces, wherein each of the one or more contiguous stretches of vertical non-textual spaces comprises a number of vertical non-textual bins, and wherein each of the vertical non-textual bins consists of non-text pixels;
determining a mean horizontal coordinate of the non-text pixels in each of the one or more contiguous stretches of vertical non-textual spaces;
segmenting the word image into one or more character images based on the mean horizontal coordinate of each of the one or more contiguous stretches of vertical non-textual spaces; and
storing each of the one or more character images along with a corresponding line number, a corresponding word number, and a corresponding character number.

9. The method of claim 8, wherein the number of vertical non-textual bins is less than a first pre-determined vertical threshold, or in excess of or equal to a second predetermined vertical threshold but less than the first pre-determined vertical threshold, wherein the first predetermined vertical threshold is determined based on an analysis of the textual image or an analysis of the textual line image, and wherein the second predetermined vertical threshold is determined based on an analysis of the textual image, an analysis of the textual line image, or an analysis of the word image.

10. The method of claim 1, wherein the position index of the character image further comprises at least one of a page number, a row number, or a column number.

11. A device for performing optical character recognition (OCR), the device comprising:
at least one processor; and
a computer-readable medium storing instructions that, when executed by the at least one processor, cause the at least one processor to perform operations comprising:
receiving a textual image;
extracting one or more character images along with one or more corresponding position indices from the textual image, wherein a position index of a character image comprises a line number, a word number, and a character number of the character image within the textual image;
determining one or more characters corresponding to the one or more character images using an OCR algorithm; and
generating a text by positioning the one or more characters based on the one or more position indices of the one or more corresponding character images, wherein the positioning the one or more characters comprises:
sorting the one or more characters in ascending order based on the one or more line numbers, followed by the one or more word numbers, and followed by the one or more character numbers;
comparing a line number of a character with a line number of preceding character;
upon determining the line number of the character to be greater than the line number of preceding character, placing the character in next line;
upon determining the line number of the character to be same as the line number of preceding character, comparing a word number of a character with a word number of preceding character;
upon determining the word number of the character to be greater than the word number of preceding character, placing the character after a space; and
upon determining the word number of the character to be same as the word number of preceding character, placing the character next to the preceding character.

12. The device of claim 11, wherein extracting comprises extracting one or more textual line images along with one or more corresponding line numbers from the textual image by:
analyzing the textual image to determine one or more contiguous stretches of horizontal non-textual spaces, wherein each of the one or more contiguous stretches of horizontal non-textual spaces comprises a number of horizontal non-textual bins, and wherein each of the horizontal non-textual bins consists of non-text pixels;
determining a mean vertical coordinate of the non-text pixels in each of the one or more contiguous stretches of horizontal non-textual spaces;
segmenting the textual image into one or more textual line images based on the mean vertical coordinate of each of the one or more contiguous stretches of horizontal non-textual spaces; and
storing each of the one or more textual line images along with a corresponding line number.

13. The device of claim 12, wherein extracting further comprises extracting one or more word images along with one or more corresponding word numbers from each of the one or more textual line images by:
analyzing each of the one or more textual line images to determine one or more contiguous stretches of vertical non-textual spaces, wherein each of the one or more contiguous stretches of vertical non-textual spaces comprises a number of vertical non-textual bins in excess of or equal to a first predetermined vertical threshold, and wherein each of the vertical non-textual bins consists of non-text pixels;
determining a mean horizontal coordinate of the non-text pixels in each of the one or more contiguous stretches of vertical non-textual spaces;
segmenting the textual line image into one or more word images based on the mean horizontal coordinate of each of the one or more contiguous stretches of vertical non-textual spaces; and
storing each of the one or more word images along with a corresponding line number and a corresponding word number.

14. The device of claim 13, wherein extracting further comprises extracting the one or more character images along with one or more corresponding character numbers from each of the one or more word images by:
analyzing each of the one or more word images to determine one or more contiguous stretches of vertical non-textual spaces, wherein each of the one or more contiguous stretches of vertical non-textual spaces comprises a number of vertical non-textual bins, and wherein each of the vertical non-textual bins consists of non-text pixels;

determining a mean horizontal coordinate of the non-text pixels in each of the one or more contiguous stretches of vertical non-textual spaces;

segmenting the word image into one or more character images based on the mean horizontal coordinate of each of the one or more contiguous stretches of vertical non-textual spaces; and storing each of the one or more character images along with a corresponding line number, a corresponding word number, and a corresponding character number.

15. The device of claim 11, wherein the position index of the character image further comprises at least one of a page number, a row number, or a column number.

* * * * *